United States Patent

[11] 3,607,375

[72] Inventor  Aleksander Jerzy Wiejak
              Hyde, England
[21] Appl. No. 705,935
[22] Filed     Feb. 16, 1968
[45] Patented  Sept. 21, 1971
[73] Assignee  Imperial Chemical Industries Limited
              Millbank, London, England
[32] Priority  Dec. 23, 1964, Dec. 23, 1964, Feb. 18,
              1965, Feb. 23, 1965
[33]          Great Britain
[31]          52272/64, 52273/64, 7076/65 and
              7817/65
              Continuation-in-part of application Ser. No.
              514,397, Dec. 16, 1965, now abandoned,
              Continuation-in-part of application Ser. No.
              524,876, Feb. 3, 1966, now abandoned,
              Continuation-in-part of application Ser. No.
              528,401, Feb. 18, 1966, now abandoned.
              This application Feb. 16, 1968, Ser. No.
              705,935

[54] PLASTIC SHEET MATERIAL HAVING DULL
     SURFACE COATING COMPRISING FILM OF
     POLYMER HAVING DISPERSED POLYESTER
     PARTICLES
     6 Claims, No Drawings

[52] U.S. Cl. .................................................. 117/138.8UA,
              117/138.8 A, 117/139.5 A, 117/145,
              117/161 K, 117/161 UC, 117/161 UH, 117/161
              UF, 117/161 UB, 117/166
[51] Int. Cl. ........................................................ B32b 27/20,
                                                          B32b 27/36
[50] Field of Search ................................................. 117/161 K,
              138.8 U, 138.8 A, 139.5 R, 145, 166, 161 UC, 161
              UH, 161 UF, 161 UB

[56]                References Cited
                UNITED STATES PATENTS
2,882,255   4/1959   Caldwell et al. ..............    260/873
2,927,863   3/1960   Marotta et al. ...............    106/228
3,227,665   4/1966   Fourcade et al. .............    260/2.5
3,293,203  12/1966   Paulus ..........................    117/161 UHH
3,428,483   2/1969   Owens .........................    117/145

OTHER REFERENCES
   Golding, Polymers and Resins, Van Nostrand Inc. 1959, pp. 598

Primary Examiner—William D. Martin
Assistant Examiner—J. E. Miller, Jr.
Attorney—Cushman, Darby & Cushman ABSTRACT: A lacquer comprising a homogeneous or heterogeneous dispersion of a linear polyester in a solution of a film-forming polymer in a liquid. Useful linear polyesters are polymers of ethylene terephthalate, ethylene isophthalate, ethylene orthophthalate, propylene terephthalate, propylene isophthalate, propylene orthophthalate and copolymers of two or more of these. Especially suitable film-forming polymers for use with the invention are copolyesters of ethylene glycol, terephthalic acid and isophthalic acid. Particularly suitable liquids for use with the invention are ethylene carbonate and propylene carbonate. In preference in the lacquer the proportion by weight of linear polyester is in the range 2 percent to 30 percent, but preferably in the range 5 percent to 20 percent, of the total weight of linear polyester plus film-forming polymer in the lacquer. In a preferred lacquer the proportion by weight of linear polyester plus film-forming polymer based on the total weight of lacquer is in the range 5 percent to 35 percent, but is more preferably in the range 10 percent to 20 percent.

PLASTIC SHEET MATERIAL HAVING DULL SURFACE COATING COMPRISING FILM OF POLYMER HAVING DISPERSED POLYESTER PARTICLES

This is a continuation-in-part of prior U.S. applications Ser. Nos. 514,397, 524,876 and 528,401, filed Dec. 16, 1965, Feb. 3, 1966 and Feb. 18, 1966, respectively, all now abandoned.

This invention relates to an improved dull lacquer which is particularly suitable for applying as a coating onto the surface of a sheet of plastics material which may be rigid or flexible. The sheet of plastics material may be unsupported or supported by a suitable substrate such as fabric, paper, etc.

Dull lacquers, generally, include a dulling agent, usually a finely divided material, which is incompatible with the film-forming constituent of the basic lacquer. For a dulling agent to be effective it is essential that, when the lacquer is applied as a coating on the surface of a sheet of plastics material and the coating heated to cause evaporation of the liquid or liquids used in the lacquer, the dulling agent is present as dispersed particles in the film so formed.

A common dulling agent is finely divided silica. This is dispersed in a solution of a film-forming material, for example polyvinyl chloride, in a volatile liquid. Coatings formed from lacquer containing silica dulling agent suffer from a number of disadvantages. The coating is easily soiled and permanently damaged by creasing or scratching, the crease or scratch being apparent as a brighter region.

An object of this invention is to provide a dull lacquer which, when applied as a coating on a sheet of plastics material, apart from enhancing the appearance of the sheet, improves its resistance to soiling and damage by creasing or scratching.

The dull lacquer of the present invention comprises a solution of a film-forming polymer in a suitable liquid medium, a high polymeric linear polyester being dispersed in the solution.

Essentially the high polymeric linear polyester component of the lacquer is incompatible with the film-forming polymer so that when a coating of the lacquer is formed on a sheet of plastics material and the liquid medium is evaporated from the coating, the high polymeric linear polyester component is present in the form of dispersed particles within the polymer film.

The lacquer may be applied to the sheet of plastics material at room or elevated temperatures by normal coating techniques, for example by brushing, spraying, roller coating, spreading, etc. The coating of lacquer is then heated to cause the liquid medium to evaporate so that a film of the film-forming polymer is formed, containing particles of the high polymeric linear polyester dispersed therein.

Useful high polymeric linear polyesters are homopolymers or copolymers of ethylene terephthalate, ethylene isophthalate, ethylene orthophthalate, propylene terephthalate, propylene isophthalate, propylene orthophthalate and mixtures thereof.

In the lacquer the proportions of linear polyester and film-forming polymer may vary over a wide range depending not only on the degree of dullness which is required but also on the actual materials selected for each component in the lacquer.

In preference in our lacquer the proportion by weight of linear polyester is in the range 2 percent to 30 percent of the total weight of linear polyester plus film-forming polymer in the lacquer.

In a preferred lacquer the proportion by weight of linear polyester plus film-forming polymer based on the total weight of lacquer is in the range 5 percent to 35 percent, but is more preferably in the range 10 percent to 20 percent.

In this application the term "solution" has the meaning employed in the high polymer art, i.e. it means a homogeneous dispersion of the polymeric solute throughout the solvent to produce a clear liquid. In contrast a heterogeneous dispersion of a polymer in a nonsolvent will be turbid.

The liquid medium used in our invention will essentially act as a solvent for the film-forming polymer. It may consist of a single component, what may be called a primary solvent, or alternatively it may be a mixture, comprising one or more primary solvents to which has been added one or more secondary solvents or diluents. In general the high polymeric linear polyesters we use in the lacquer have a lower solubility in the liquid medium than the film-forming polymer.

In one form of our invention the linear polyester is dispersed homogeneously in the solution of the film-forming polymer, i.e. the liquid medium used to form the solution of the film-forming polymer also acts as a solvent for the polyester. In use, when the liquid medium is evaporated from a coating of the lacquer, the polyester, being present in a minor proportion relative to the film-forming polymer and being incompatible with the film-forming polymer, is precipitated in the form of particles within the solid film of the film-forming polymer.

In another form, the preferred form of our invention the linear polyester is dispersed heterogeneously in the solution of the film-forming polymer, i.e. the liquid medium used to form the solution of the film-forming polymer is nonsolvent for the linear polyester. In this form of our invention we prefer that the linear polyester comprises particles having a size in the range 0.5 to 5 microns. The linear polyester can be added to the solution of the film-forming polymer either as a dry or wet powder or as a slurry in a chosen liquid. Preferably, however, a solution of the polyester in a solvent therefor is mixed with the solution of the film-forming polymer in another solvent therefor the mixture of the two solvents being a nonsolvent for the polyester so that it is precipitated from the mixed solutions in particulate form. Alternatively both the polyester and the film-forming polymer may be dissolved in a hot liquid, the liquid when cooled being a solvent for the film-forming polymer but a nonsolvent for the polyester. In this case the polyester is precipitated in the form of fine particles when the hot solution is cooled down. Alternatively the lacquer may be formed by adding a diluent, which is a nonsolvent for the polyester, to a solution containing both the polyester and the film-forming polymer so as to precipitate the polyester in the form of fine particles while the film-forming polymer remains in solution.

Any of the commonly used film-forming polymers may be used in the lacquer. Examples of these are homopolymers or copolymers of vinyl chloride, polymers or copolymers of acrylic esters or substituted acrylic esters, polyvinyl acetals, polyvinyl acetate, cellulose acetate and cellulose acetate butyrate and cellulose nitrate or mixture of two or more of these. A useful film-forming polymer comprises a mixture of polyvinyl chloride and polymethyl methacrylate, preferably in the weight range from 1:4 to 4:1 respectively.

We have found that a particularly desirable group of film-forming materials, which have hitherto not been used for this purpose are the more soluble linear copolyesters such as copolyesters of ethylene glycol, terephthalic acid and isophthalic acid or copolyesters of propylene glycol, terephthalic acid and isophthalic acid.

Above, we have listed the high linear polyesters which may usefully be used as dulling agents in lacquers of the present invention. Included in this list were certain copolyesters. It should be understood, however, that when the polymeric film-forming component of the lacquer is a copolyester, such as a copolyester of ethylene glycol, terephthalic acid and isophthalic acid, then the material which serves as the dulling agent will essentially have to be a high polymeric linear polyester which is different to and incompatible with the one used as the polymeric film-forming component. We have found that when the film-forming component used is a copolyester then a satisfactory dulling agent may be selected from the homopolymers listed above.

A preferable dull lacquer is one in which the film-forming component is a copolyester of ethylene glycol, terephthalic acid and isophthalic acid and the dulling agent to poly (ethylene terephthalate). These components are particularly suitable because the copolyesters of ethylene glycol, terephthalic acid and isophthalic acid are more soluble than poly (ethylene terephthalate). A particularly suitable copolyester is one in which the ratio of ethylene terephthalate to ethylene isophthalate in the polymer is substantially 60:40.

It will be realized that a variety of liquids may be suitable for use in the liquid medium of the lacquer. Typical solvents such as toluene, benzene, methyl ethyl ketone, ethyl acetate, chlorinated hydrocarbons such as chloroform or ethylene dichloride, 2-pyrrolidone or substituted 2-pyrrolidone, cyclohexanone, tetrahydrofurane, ethylene carbonate or propylene carbonate may, in certain cases, be used to advantage. Whether or not a solvent is suitable will depend on a number of factors, e.g. the other constituents of the lacquer; compatibility of the solvent with the material to which the lacquer is to be applied; its boiling point, its cost.

Included in the lacquer of the present invention may be any of the normal constituents used in the art, for example, pigments, dyestuffs or stabilizers. Such constituents may be homogeneously or heterogeneously dispersed in the liquid medium.

The invention is further illustrated by the following examples in which all parts are by weight.

EXAMPLE 1

A basic lacquer solution (A) was formed by dissolving 85 parts of polymethyl methacrylate in 765 parts of a solvent mixture containing equal parts of acetone and toluene at room or elevated temperature.

A second solution (B) was formed by dissolving 15 parts of polyethylene terephthalate in 135 parts of propylene carbonate (4-methyldioxolone-2) at a temperature of approximately 200° C.

The hot solution (B) was slowly added to cold solution (A) with vigorous stirring using a high-speed electric stirrer.

During mixing of the two solutions, polyethylene terephthalate was precipitated in the form of very fine particles, the polymethyl methacrylate remaining in solution.

EXAMPLE 2

A basic lacquer solution (C) was formed by dissolving 45 parts of polymethyl methacrylate and 45 parts of "Corvic" S 46/70 ("Corvic" is the registered trademark of a copolymer of vinyl chloride and vinyl acetate manufactured by Imperial Chemical Industries Limited) in 810 parts of methyl ethyl ketone at room or elevated temperature.

A second solution (D) was formed by dissolving 10 parts of polyethylene terephthalate in 90 parts of a solvent mixture containing equal parts of ethylene carbonate (dioxolone-2), propylene carbonate (4-methyldioxolone-2) and cyclohexanone at a temperature of approximately 210° C.

The hot solution (D) was added slowly to a cold solution (C) with very vigorous stirring.

During mixing of the two solutions, polyethylene terephthalate was precipitated in the form of very fine particles. The polymethyl methacrylate and vinyl chloride/acetate copolymer remaining in solution.

EXAMPLE 3

A basic lacquer solution (E) was formed by dissolving 60 parts of "Corvic" H55/34 and 60 parts of Diakon MG100 in 880 parts of a solvent mixture containing equal parts of methyl ethyl ketone and toluene at elevated temperatures. The solution was cooled to room temperature.

("Corvic" is the registered trademark of a polymer of vinyl chloride manufactured by Imperial Chemical Industries Limited; "Diakon" is the registered trademark of a polymer of methyl methacrylate manufactured by Imperial Chemical Industries Limited.)

A second solution was formed by dissolving 20 parts of polyethylene terephthalate in 146 parts of a solvent mixture containing equal parts of ethylene carbonate (dioxolone-2) and propylene carbonate (4-methldioxolone-2) at a temperature of approximately 210° C. with continuous stirring. As the solution was cooled down the polyethylene terephthalate came out of solution as fine particles to form a slurry (F) at room temperature.

The cold solution (E) and slurry (F) were introduced into a ball mill and milled for 4 hours to form a lacquer which was suitable for applying as a coating to the surface of a plastic sheet material.

EXAMPLE 4

Three hundred parts of a copolyester containing ethylene terephthalate and ethylene isophthalate (the radical ratio in the polymer being 60:40) and having an intrinsic viscosity of 0.744 was added to a mixture of 350 parts of N-methyl-2-pyrrolidone and 350 parts of tetrahydrofurane. The resulting mixture was boiled in a vessel provided with a reflux condenser until the copolyester was completely dissolved so forming a clear solution. To this solution was added 1,000 parts of methyl ethyl ketone. The resulting solution (G) was allowed to cool down to room temperature.

Seventy-five parts of high molecular weight polyethylene terephthalate was added to a mixture of 225 parts of N-methyl-2-pyrrolidone and 225 parts of cyclohexanone. The resulting mixture was heated to about 170° C. and stirred until a clear solution (H) was obtained.

The hot solution (H) was added slowly to the cold solution (G) with very vigorous stirring.

The polyester precipitated immediately providing a stable dispersion of very fine polyester particles in the clear solution of the copolyester. A sample of the lacquer obtained was spread by means of a roller knife onto the surface of a sheet of plasticized polyvinyl chloride. The sheet was heated to cause evaporation of the liquid media in the lacquer, the resulting coating being smooth and dull.

Example 5

Ninety parts of copolyester containing ethylene terephthalate and ethylene isophthalate (the ratio of the radicals in the polymer being 60:40) and having an intrinsic viscosity of 0.42 was added to 90 parts of N-methyl-2-pyrrolidone, at room temperature. When stirred the copolyester dissolved to form a clear solution (I).

Thirty parts of high molecular weight polyethylene terephthalate was added to a mixture of 135 parts of N-methyl-2-pyrrolidone and 135 parts of cyclohexanone. The resulting mixture was heated to about 170° C. with stirring until a clear solution (J) was obtained.

The solution (J) was added slowly to the solution (I) which was stirred vigorously.

The polyester precipitated immediately providing a stable dispersion of very fine polyester particles in the clear solution of the copolyester. A sample of the lacquer obtained was spread onto a sheet of plasticized polyvinyl chloride, the sheet then being heated to cause evaporation of the liquid media, a film, having a dull appearance, being formed on the sheet.

EXAMPLE 6

A solution (K) was formed by heating, with stirring a mixture of 125 parts of copolyester of ethylene terephthalate and ethylene isophthalate (the ratio of the radicals in the polymer being 60:40), 450 parts of cyclohexanone and 425 parts of tetrahydrofurane.

Fifteen parts of high molecular weight polyethylene terephthalate was added to 135 parts of N-methyl-2-pyrrolidone and heated to about 170° C. with stirring until a clear solution (L) was obtained.

The hot solution (L) was added very slowly to the cold solution (K) which was stirred vigorously with a high-speed stirrer. The lacquer formed comprised a stable dispersion of very fine polyester particles in the clear solution of the copolyester. A sample of this was spread onto the plastic surface of a plasticized polyvinyl-chloride-coated fabric and the sheet heated to cause evaporation of the liquid media in the lacquer. The plastic sheet now had a very smooth and dull finish.

EXAMPLE 7

A mixture comprising 100 parts of a copolyester of ethylene terephthalate and ethylene isophthalate (the ratio of the radicals in the polymer being 60:40), 10 parts of polyethylene terephthalate, 450 parts of N-methyl-2-pyrrolidone and 440 parts of cyclohexanone was heated, with stirring, to about 170° C. until a clear solution was obtained.

The solution was cooled down before being applied onto the surface of a sheet of plasticized polyvinyl-chloride-coated fabric. The coated surface was heated to cause evaporation of the liquid media. A very smooth dull finish was obtained.

EXAMPLE 8

A mixture of 50 parts of polymethyl methacrylate, 50 parts of low molecular weight polyvinyl chloride, 450 parts of methyl ethyl ketone and 450 parts of toluene was heated, with stirring, to about 70° C. until a clear solution was obtained.

The solution was cooled down to room temperature and introduced together with 20 parts of finely divided particles of highly polymeric polyethylene terephthalate, having a particle size in the range 1 to 3 microns, into a ball mill. The charge was ball milled for about 4 hours.

A sample of the lacquer obtained was spread by means of a roller knife onto the surface of a sample of polyvinyl-chloride-coated fabric, the lacquer coating then being heated to a temperature of about 100° C. The coating obtained had a dull appearance.

EXAMPLE 9

A mixture of 160 parts of polymethyl methacrylate, 425 parts of acetone and 425 parts of toluene was stirred at room temperature until a clear solution was obtained.

A dispersion of a highly polymeric linear polyester was also formed by ball milling 20 parts of finely divided polyethylene terephthalate particles having particle size of about 1 micron, with 113 parts of tetrahydrofurane for about 3 hours.

The dispersion of the high polymeric linear polyester was added to the clear solution obtained above and the mixture was stirred vigorously for about 3 minutes.

A sample of the lacquer obtained was spread by means of a roller knife onto the surface of a sample of embossed polyvinyl chloride sheet, the lacquer coating being heated to cause evaporation of the liquid media. The coating obtained had a dull finish.

Example 10

A mixture of 100 parts of dry cellulose nitrate, 500 parts of methylated spirit, 830 parts of acetone and 10 parts of dry finely divided polyethylene terephthalate particles, having a particle size in the range 1 to 3 microns was milled in a ball mill for about 4 hours.

The ball-milled product was a lacquer, a sample of which was spread on the surface of a sample of nitrocellulose coated fabric. After heating the sample to cause evaporation of the liquid media the resulting coating was smooth and dull.

EXAMPLE 11

A solution (M) was formed by dissolving 50 parts of low molecular weight polyvinyl chloride and 50 parts of polymethyl methacrylate in a 900 parts of a solvent mixture consisting of equal volumes of acetone and toluene at a temperature of 60° to 70° C. The solution was then allowed to cool down to room temperature.

A solution (N) was formed by dissolving 25 parts of polyethylene terephthalate, having an intrinsic viscosity of 0.65, in 225 parts of N-methyl-2-pyrrolidone at a temperature of approximately 170° C.

The solution (N) while still hot, was slowly added to solution (M) which was vigorously agitated by means of a high-speed stirrer. The polyester was precipitated immediately in the form of very fine particles dispersed in the solution of the other two polymers.

The lacquer obtained in this way was applied as a coating on the surface of plasticized polyvinyl chloride sheet material, and heated to cause evaporation of the liquid medium. The resulting dry film remaining was smooth and dull.

EXAMPLE 12

A solution (0) was formed by dissolving 30 parts of high molecular weight polyethylene terephthalate, having an intrinsic viscosity of 0.41, in 120 parts of a solvent mixture consisting of equal parts of N-methyl-2-pyrrolidone and cyclohexanone at a temperature of about 170° C.

A solution (P) was formed by dissolving 90 parts of polymethyl methacrylate in 510 parts of a solvent mixture consisting of equal volumes of toluene and methyl ethyl ketone.

The hot solution (0) was added slowly, with vigorous stirring, to the cold solution (P).

The lacquer obtained was spread onto an extruded sheet made from acrylonitrile/butadiene/styrene copolymer. Heat was applied to the coated sheet to cause evaporation of the liquid medium leaving a film on the sheet which was smooth and dull.

Example 13

A solution (Q) was formed by dissolving 55 parts of a copolymer of vinyl chloride and vinyl acetate such as "Corvic" S45/70 ("Corvic" being a registered trademark), 55 parts of polymethyl methacrylate and 10 parts of cellulose acetate butyrate in 1,000 parts of a solvent mixture consisting of 2 parts by volume of toluene and 1 part by volume of acetone.

The cold solution (Q) and hot solution (N) (prepared as in example 1) in the ratio 4:1 parts by volume respectively were mixed with vigorous stirring.

The lacquer obtained was spread on the surface of a polyvinyl chloride sheet material and the liquid caused to evaporate by the application of heat. The finish obtained was smooth and dull.

Thus having described the invention what I claim is:

1. A sheet of plastics material having a surface coated with a continuous film consisting essentially of at least one thermoplastic, film-forming polymer selected from the group consisting of homopolymers and copolymers of vinyl chloride, homopolymers and copolymers of acrylic esters and substituted acrylic esters, polyvinyl acetates, cellulose acetate, cellulose acetate butyrate, cellulose nitrate and mixtures of two or more of these, linear copolyesters of ethylene glycol, terephthalic acid and isophthalic acid and copolyesters of propylene glycol, terephthalic acid and isophthalic acid in which are dispersed finely divided particles of high polymeric linear polyester having ester linkages connecting repeating units in the polymer chain, selected from the group consisting of polymers of ethylene terephthalate, ethylene isophthalate, ethylene orthophthalate, propylene terephthalate, propylene isophthalate, propylene orthophthalate and copolyesters of two or more of these and which is incompatible with the film-forming polymer, the coating reducing tendency to soiling of the coated surface.

2. A sheet of plastics material as set forth in claim 1 in which the liner polyester is dispersed in the film as particles having a size in the range 0.5 to 5 microns.

3. A sheet of plastics material as set forth in claim 1 in which the proportion by weight of linear polyester is in the range 2 percent to 30 percent of the total weight of linear polyester plus film-forming polymer in the film.

4. A sheet of plastics material as set forth in claim 1 in which the proportion by weight of linear polyester is in the range 5 percent to 20 percent of the total weight of linear polyester plus film-forming polymer in the film.

5. A sheet of plastics material as claimed in claim 1 in which the film-forming polymer is a copolyester of ethylene glycol, terephthalic acid and isophthalic acid.

6. A sheet of plastics material as claimed in claim 1 in which the film-forming polymer is a copolyester containing ethylene terephthalate and ethylene isophthalate, the ratio of the radicles in the polymer being 60:40.